Jan. 20, 1970  YASUO TAKAHASHI  3,490,825

HIGHLY CORRECTED WIDE BAND LENS SYSTEM

Filed Feb. 9, 1966

INVENTOR.
YASUO TAKAHASHI
BY Stanley Wolder

Patented Jan. 20, 1970

3,490,825
HIGHLY CORRECTED WIDE BAND
LENS SYSTEM
Yasuo Takahashi, Tokyo-to, Japan, assignor to Asahi Kogaku Kogyo Kabushiki Kaisha, Tokyo-to, Japan, a corporation of Japan
Filed Feb. 9, 1966, Ser. No. 526,239
Claims priority, application Japan, Feb. 16, 1965, 40/8,464
Int. Cl. G02b 9/60, 1/62
U.S. Cl. 350—2     2 Claims

ABSTRACT OF THE DISCLOSURE

An objective lens system highly corrected for chromatic aberration in the range of 200 to 800 m$\mu$ comprises five lenses the first and fourth lenses being negative and formed of silica and the other lenses being positive fluorte lenses, the lens system possessing the following parameters:

$$-2/F \leq \phi_1 \leq -1/F$$
$$2.8F \geq \phi_{1.2.3} \geq 1.5/F$$
$$-1.2/F \leq \phi_{1.2.3.4} \leq 0$$
$$r_9 \leq F$$

wherein $\phi_{1.2 \ldots i}$ is the resultant power of the lenses $L_1$ to $L_i$, that is, from the first to the $i$th lenses; F is the resultant focal length; and $r_i$ is the radius of curvature of the $i$th face.

---

The present invention relates to a photographic lens system on which an improved correction of chromatic aberration is made.

Generally, hitherto employed photographic lens systems have been of poor transmittivity with respect to light rays of shorter wave length range. Especially, in recently produced lens systems having greater number of lenses for obtaining larger relative aperture or made of optical glasses containing rare elements such as lanthanum or tellurium, light rays of shorter wave length range are absorbed and do not reach the photosensitive film. Thus, although the film has the character of being sensitive to light rays of shotrer wave length range, because of the above mentioned tendency of the lens system improvement of lens system brightness due to increase in relative aperture is actually checked. Therefore, such improvement would be brought to a high degree by a lens system which absorbs less amount of shorter wave length range light rays and excites the film with the corresponding shorter wave length range light rays. Such lens system, however, presents a difficulty in making corrections of chromatic aberration with respect to light rays ranging from very short to very long wave lengths.

Ultra-achromatic lens systems that have been hitherto provided or in use have been unable to have a large photographing image angle because their Petzval sums have been relatively large. Therefore, only those with very narrow image angle have been in practical use.

It is therefore a principal object of the present invention to provide a photographic lens system which is sufficiently corrected for chromatic aberration with respect to light rays ranging from very short to very long wave lengths.

Another object of the present invention is to provide a photographic lens system which is very effectively corrected for chromatic aberration with respect to light rays of such wide wave length range as from 200 to 800m$\mu$.

Still another object of the present invention is to provide an improved lens system which enables the hitherto absorbed light to reach the film and to excite same, thus improving the film exciting efficiency.

A further object of the present invention is to provide an ultra-achromatic lens system having ordinary photographing image angle, the defect of narrow image angle of the conventional ultraachromatic lens systems being eliminated.

Figure 1:
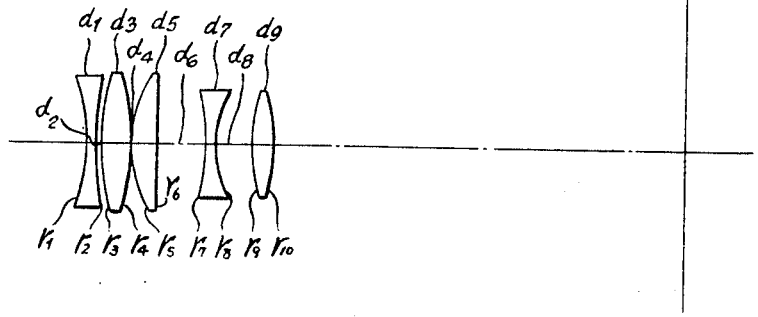
Figures 2A, 2B, 2C, 2D:
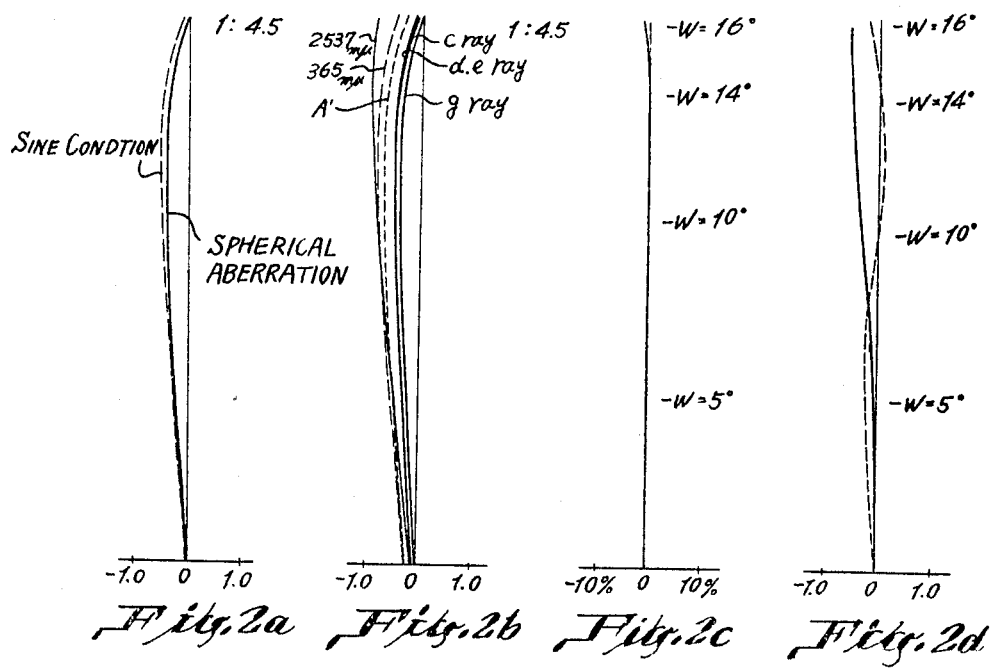

The above and other objects of the present invention will become apparent from reading of the following description taken in conjunction with the accompanying drawing wherein:

FIGURE 1 is a longitudinal sectional view of the lens system embodying the present invention; and FIGURE 2 is a group of curves illustrating the aberration characteristics of a lens system of the present invention, (a) indicating spherical aberration (solid line) and sine condition (dotted line), (b) chromatic differences of spherical aberrations, (c) distortion and (d) astigmatism.

In order to attain the above mentioned objects, in the present invention novel materials are employed for the lenses, and the optical design of the lens system has been carried out with due consideration to the chracteristics of such novel material. In the present invention, as such novel materials there are utilized fluorite and/or fused silica, which have come into use recently due to development in their artificial production.

Referring now to FIGURE 1, the lens system according to the present invention consists of five lenses forming five groups, comprising the first lens $L_1$ which is negative, the second lens $L_2$ which is positive, the third lens $L_3$ which is positive, the fourth lens $L_4$ which is negative, and the fifth lens $L_5$ which is positive, the lenses being separated one from another. The positive lenses are made of fluorite while the negative lenses are made of fused silica. This lens system satisfies the following condition:

(I)     $-2/\phi \leq F_1 \leq -1/F$
(II)    $2.8/\phi \geq F_{1.2.3} \geq 1.5/F$
(III)   $-1.2\phi \leq F_{1.2.3.4} \leq 0$
(IV)    $r_9 \leq F$ wherein $\phi_{1.2 \ldots i}$ is the resultant power of the lenses $L_1$ to $L_i$, that is, from the first to thé $i$th lenses; F is the resultant focal length; $r_i$ is the radius of curvature of the $i$th face.

If $\phi_1$ is greater than $-1/F$ in the condition (I) $-2/F \leq \phi_1 \leq -1/F$, it is quite natural that $\phi_1$ is neither useful for decreasing the Petzval sum value nor serves as a condition of correcting chromatic aberration. On the contrary, if $\phi_1$ is less than $-2/F$ in the above condition (I), power to decrease the Petzval sum value is so excessively great as to cause trouble with respect to the condition of correcting chromatic aberration and the balanced relationship between the front group including the first lens and the group of the following lenses.

$\phi_1$ defined by the condition (I) is more effective when the condition (II) $2.8/F \geq \phi_{1, 2, 3} \geq 1.5/F$ is satisfied. Since the second lens ($L_2$) and the third lens ($L_3$) are positive, when the power of the first, second and third lenses ($L_1$, $L_2$, $L_3$) is defined within a sphere shown by the Formulae (I) and (II), problems about correction of chromatic aberration and the Petzval sum value will be favorably settled. Then, in case that the power of these three lenses is actually decided, proportion of the power of the first lens ($L_1$) and the second lens ($L_2$) can be decided suitably in order to keep balance of other aberrations than chromatic aberration.

If $\phi_{1, 2, 3}$ is less than $1.5/F$ of the condition (II) $2.8/F \geq \phi_{1, 2, 3} \geq 1.5/F$, it does not contribute to decreasing the Petzval sum value and correcting chromatic aberration under the condition (III) $-1.2/F \leq \phi_{1, 2, 3, 4} \leq 0$.

If we take the first group of a negative lens and a positive lens together with the third lens ($L_3$) as a single lens, it can be regarded as a modification of a Triplet type lens. Accordingly, now that it is expected to obtain more excellent effect about correction of chromatic aberration and decrease of the Petzval sum than that obtained by the power $\phi_1$ of the first lens ($L_1$), total of the power of the first, second and third lenses must be great.

However, when $\phi_{1,2,3}$, power of the first, second and third lenses, is greater than $2.8/F$, spherical aberration and coma aberration become worse. Consequently, only dark lenses can actually be used. In order to keep good efficiency with a lens brighter than 1:8, $\phi_{1,2,3}$ should necessarily be under $2.8/F$.

The condition (III) $-1.2/F \leq \phi_{1,2,3,4} \leq$ is essential for correcting chromatic aberration and decreasing the Petzval sum value in the front group lens system defined by the conditions (I) and (II). Provided $\phi_{1,2,3,4}$ is greater than 0, Petzval sum value cannot be decreased as intended, and therefore, the balance of astigmatism cannot be kept properly. Moreover, as the condition (II) defines the negative power of the fourth lens ($L_4$), the chromatic aberration cannot be sufficiently corrected and the purpose cannot be attained, when $\phi_{1,2,3,4}$ is greater than 0.

On the contrary, if $\phi_{1,2,3,4}$ is less than $-1.2/F$ of the condition (III), chromatic aberration is corrected too much and Petzval sum value is excessively decreased. Further, since the absolute value of the seventh and eighth radius of curvature ($r_7$) ($r_8$) becomes too small, it is difficult to remove all aberrations which come about there, the lens cannot be actually used when it is brighter than 1:8, and the lens is not suitable when it is desirable that the half of the photographing image angle of the lens is 15° or more.

Said conditions (I) (II) (III) are related to each other and they are the basis to compose the lens of this invention. For example, when $\phi_{1,2,3}$ is $2.8/F$, $\phi_1$ is decided near to $-2/F$ in order to avoid chromatic aberration of the first, second and third lenses ($L_1$, $L_2$, $L_3$). Consequently, if the space between the third lens ($L_3$) and the rear group of lenses ($L_4$, $L_5$ . . .) is made rather big, the Petzval sum value is effectively decreased but chromatic aberration does not become worse.

When $\phi_1$ is decided near to $-1/F$, it is not advisable to arrange the third lens ($L_3$) and the fourth lens ($L_4$) with a big space between them in view of chromatic aberration. If $\phi_{1,2,3,4}$ is decided near to $-1.2/F$, however, chromatic aberration can be corrected at the following lens system. In case that $\phi_{1,2,3,4}$ is decided excessively near to $-1.2/F$, it will bring disadvantage for a lens used with a large photographing image angle.

According to the embodiment, in the condition of $1/F=1$, the value of $\phi_1$, $\phi_{1,2,3}$ and $\phi_{1,2,3,4}$ are explained as follows. $\phi_1 = -1.6$, $\phi_{1,2,3} = 2.25$, $\phi_{1,2,3,4} = -0.45$. The brightness of the embodiment is 1:4.5 and half of photographing image angle is 16°.

The condition (IV) $r_9 \leq F$ serves to prevent excessive correction of astigmatism chiefly coming about on the eighth surface ($r_8$) of the lens composed in accordance with the conditions (I) (II) (III). When the group of the first, second and third lens is regarded as a single lens, said eighth surface corresponds to the fifth surface ($r_5$) of the Triplet type lens, and then it can be said that the radius of curvature is unprecedented in smallness. If the radius of curvature is made extremely small, each aberration becomes worse, and bright lens cannot be used practically.

The lens of this invention can have the Petzval sum value which is about 0.4. Regarding the lens system including fluorite, bright lenses are Petzval type lenses and the present invention made it possible for the first time to produce an anastigmat bright lens with fluorite. Besides, the present invention utilized irregular dispersion of fluorite and succeeded in correcting chromatic aberration with respect to light rays ranging from very short to very long wave lengths.

One example of the present invention as illustrated in FIG. 1 is as follows:

[1:4.5  f=100 mm.]

| | | |
|---|---|---|
| $r_1 = -38.500$ | $d_1 = 1.50$ | $L_1 = 1.45854/69.6$ |
| $r_2 = 113.490$ | $d_2 = 1.00$ | |
| $r_3 = 55.500$ | $d_3 = 5.00$ | $L_2 = 1.43387/94.9$ |
| $r_4 = -52.896$ | $d_4 = 0.20$ | |
| $r_5 = 24.500$ | $d_5 = 6.00$ | $L_3 = 1.43387/94.9$ |
| $r_6 = -136.347$ | $d_6 = 8.50$ | |
| $r_7 = -38.000$ | $d_7 = 2.00$ | $L_4 = 1.45854/69.6$ |
| $r_8 = 20.007$ | $d_8 = 7.00$ | |
| $r_9 = 39.000$ | $d_9 = 4.00$ | $L_5 = 1.43387/94.9$ |
| $r_{10} = -60.456$ | | |

The table of Seidel's aberration coefficient in connection with the above example is as follows:

| | $S_1$ | $S_2$ | $S_3$ | P | $S_5$ |
|---|---|---|---|---|---|
| 1 | −3.777 | 1.454 | −0.559 | −0.816 | 0.529 |
| 2 | −6.538 | −2.658 | −1.080 | −0.277 | −0.552 |
| 3 | 14.865 | 4.481 | 1.350 | 0.545 | 0.571 |
| 4 | 2.061 | −0.837 | 0.340 | 0.572 | −0.370 |
| 5 | 16.578 | 4.593 | 1.272 | 1.235 | 0.694 |
| 6 | 11.194 | −2.817 | 0.709 | 0.221 | 0.234 |
| 7 | −23.838 | 2.154 | −0.194 | −0.827 | 0.092 |
| 8 | −14.886 | −7.948 | −4.244 | −1.571 | −3.105 |
| 9 | 3.283 | 2.778 | 2.351 | 0.775 | 2.647 |
| 10 | 3.265 | −0.543 | 0.090 | 0.500 | −0.098 |
| Sum | 2.207 | 0.655 | 0.035 | 0.358 | 0.174 |

While there has been described and illustrated a preferred embodiment of the present invention it is apparent that numerous alterations, omissions and additions may be made without departing from the spirit thereof.

What is claimed is:

1. A lens system highly corrected for chromatic aberration in the range of 200 to 800 mμ comprising five lenses designated consecutively from the front to the rear as the first to the fifth lens, the first lens is a negative fluorite lens with a forwardly concave front face and a rearwardly concave rear face, the second lens is a positive fused silica lens with a forwardly convex front face and a rearwardly convex rear face, the third lens is a positive fused silica lens with a forwardly convex front face and a rearwardly convex rear face, the fourth lens is a negative fluorite lens with a forwardly concave front face and a rearwardly concave rear face, and the fifth lens is a positive fused silica lens with a forwardly convex front face and a rearwardly convex rear face.

2. A lens system comprising five lenses having faces designated consecutively from the front to the rear as the first to the tenth face, the first and fourth lenses being negative fused silica lenses and the second, third and fifth lenses being positive fluorite lenses, and having approximately the following dimensions:

| | |
|---|---|
| $r_1 = -.38500F$ | $d_1 = .0150F$ |
| $r_2 = 1.13490F$ | $d_2 = .0100F$ |
| $r_3 = .55500F$ | $d_3 = .0500F$ |
| $r_4 = -.52896F$ | $d_4 = .0020F$ |
| $r_5 = .24500F$ | $d_5 = .0600F$ |
| $r_6 = -1.36347F$ | $d_6 = .0850F$ |
| $r_7 = -.38000F$ | $d_7 = .0200F$ |
| $r_8 = .20007F$ | $d_8 = .0700F$ |
| $r_9 = .39000F$ | $d_9 = .0400F$ |
| $r_{10} = -.60456F$ | | wherein $r_i$ is the radius of curvature of the corresponding subscript designated lens face, $d_i$ is the distance between the subscript designated lens face and the next consecutively rearward lens face, and F is the focal length of the lens system.

References Cited

UNITED STATES PATENTS 3,035,490   5/1962   Tibbetts _____ 350—177 X

JOHN K. CORBIN, Primary Examiner

U.S. Cl. X.R.

350—177, 216